Figure 1:
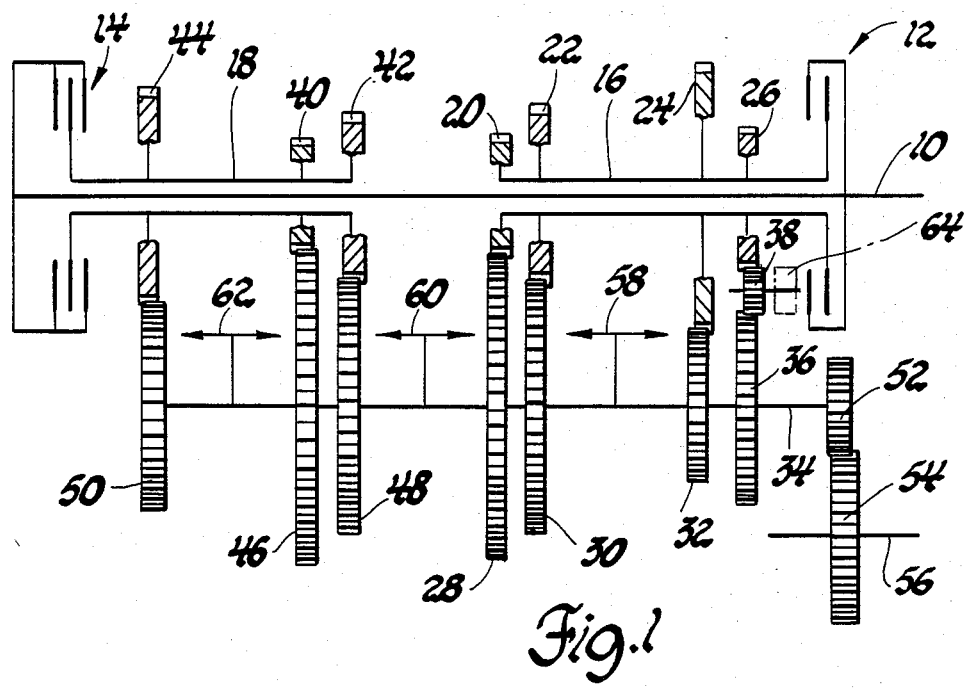

United States Patent [19]

Koivunen

[11] Patent Number: 4,513,631
[45] Date of Patent: Apr. 30, 1985

[54] DUAL INPUT CLUTCH TRANSMISSION

[75] Inventor: Erkki A. Koivunen, Livonia, Mich.

[73] Assignee: General Motors Corporation, Detroit, Mich.

[21] Appl. No.: 504,794

[22] Filed: Jun. 16, 1983

[51] Int. Cl.³ .............................................. F16H 3/08
[52] U.S. Cl. ........................................ 74/360; 74/331; 74/359; 74/357
[58] Field of Search .................... 74/360, 359, 357, 331

[56] References Cited

U.S. PATENT DOCUMENTS

| | | | |
|---|---|---|---|
| 2,386,540 | 10/1945 | Campodonico | 74/360 X |
| 2,543,412 | 2/1951 | Kegresse | 74/330 |
| 2,599,801 | 6/1952 | Youngren | 74/330 |
| 2,972,899 | 2/1961 | Wiggermann | 74/360 X |
| 4,470,326 | 9/1984 | Schmidt | |

FOREIGN PATENT DOCUMENTS

| | | | |
|---|---|---|---|
| 2452739 | 5/1976 | Fed. Rep. of Germany | 74/360 |
| 2644113 | 6/1978 | Fed. Rep. of Germany | 74/360 |
| 1350781 | 12/1964 | France | 74/331 |
| 2064028 | 6/1981 | United Kingdom | 74/330 |

Primary Examiner—George H. Krizmanich
Assistant Examiner—Dirk Wright
Attorney, Agent, or Firm—Donald F. Scherer

[57] ABSTRACT

A dual input clutch transmission has four forward speed ratios. The first and second ratios are duplicated so that a third ratio to first ratio and a fourth ratio to second ratio downshift pattern can be utilized.

5 Claims, 2 Drawing Figures

DUAL INPUT CLUTCH TRANSMISSION

This invention relates to power transmissions and more particularly to power transmissions having a dual input clutch arrangement.

Prior art dual input clutch transmissions have two input shafts, each of which is controlled for connection with the drive shaft by a selectively engageable clutch mechanism. One input shaft has drivingly associated therewith the odd numbered gear ratios while the other input shaft has associated therewith the even numbered gear ratios.

As is well-known with such transmissions, a ratio can be established between each input shaft and the transmission output shaft simultaneously. The determining factor for which ratio is established, is the engagement of the input clutch with the respective input shaft. Therefore, for example, to change from first ratio to second ratio, it is merely necessary to swap or interchange input clutches. At this point, the third ratio can be connected while the first ratio is disconnected. An interchange between second and third ratio can then take place by again merely changing the input clutches.

A similar arrangement takes place for the ratio change from third ratio to fourth ratio. Since the first and third ratios are drivingly connected to the same input shaft, and the second and fourth ratios are drivingly connected to the other input shaft, a downshift from third to first or from fourth to second cannot be achieved without disconnecting both input clutches.

The present invention provides a gearing arrangement which will permit third to first or fourth to second downshifts. This is accomplished through the addition of duplicate first and second ratio gear sets on each input shaft. Thus, a downshift ratio change from fourth to second can be accomplished by establishing the second ratio relative to the one input shaft while the fourth ratio is operating through the other input shaft. By interchanging the input clutches, a fourth to second downshift will occur. After the downshift has occurred, the second gear ratio can be established between both input shafts and the output shaft, after which time, the second gear ratio used for downshift can be disestablished so that the first gear or third gear ratio can be utilized should an upshift or downshift from second be desired.

It is an object of this invention to provide an improved dual input clutch transmission wherein duplicate first and second ratio gear sets are provided so that fourth to second and third to first downshift ratio interchanges can be accomplished.

It is another object of this invention to provide in an improved dual input clutch transmission a pair of input shafts which are selectively connectable to an output shaft through a plurality of ratio gear sets wherein one input shaft can be utilized for first, second and third ratio while the other input shaft can be utilized for first, second and fourth ratio thereby permitting the operator to select third to first or fourth to second downshifts if desired.

Figure 2:
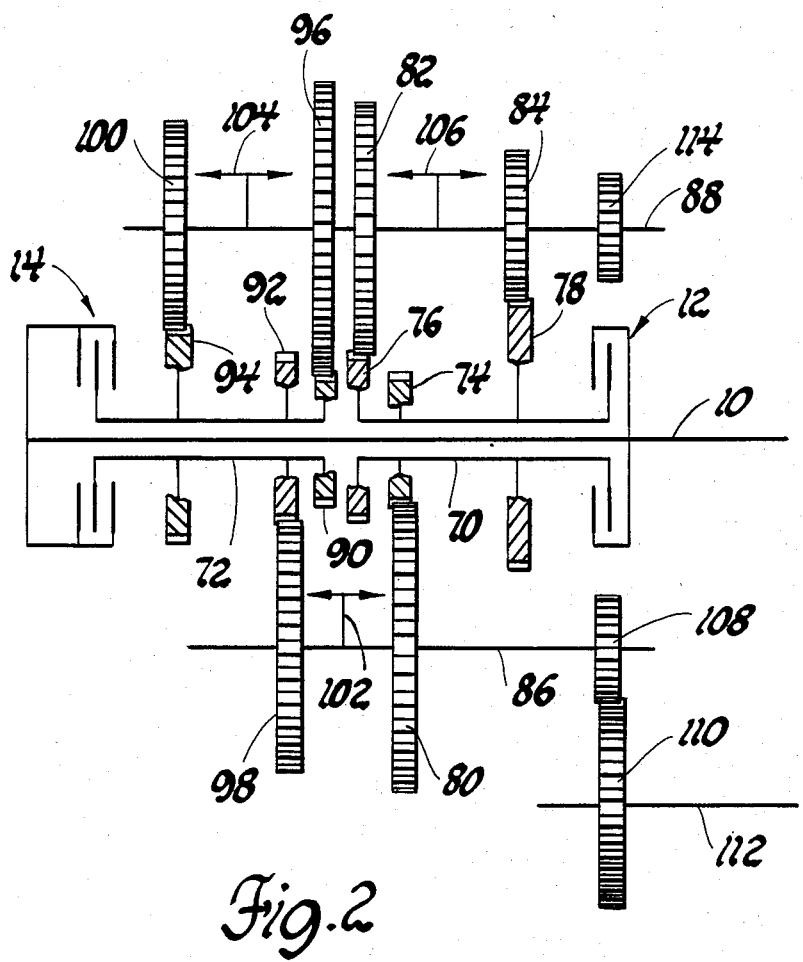

These and other objects and advantages of the present invention will be more apparent from the following description and drawings in which:

FIG. 1 is a schematic representation showing one embodiment of the invention; and FIG. 2 is a schematic representation showing another embodiment of the invention.

Referring to the drawings, there is seen in FIG. 1 a transmission arrangement having a drive shaft 10 to which is drivingly connected a pair of selectively engageable input clutches 12 and 14. The input clutch 12 is drivingly connected with a transmission input shaft 16 and the input clutch 14 is drivingly connected with an input shaft 18. The transmission input shaft 16 has drivingly connected therewith a plurality of ratio drive gears 20, 22, 24 and 26. The ratio gears 20, 22 and 24 mesh with ratio driven gears 28, 30 and 32, respectively, and are sized to provide first, second and fourth drive ratios, respectively. The driven ratio gears 28, 30 and 32 are rotatably supported on a transmission output shaft 34. A reverse gear 36 is drivingly connected to the output shaft 34. The reverse gear 36 is selectively connectable to drive gear 26 through an idler gear 38. The idler gear 38 is movable into and out of mesh with the gears 36 and 26 in a well-known manner.

The transmission input shaft 18 has drivingly connected thereto a plurality of ratio drive gears 40, 42 and 44 which mesh with gears 46, 48 and 50, respectively. The gears 46, 48 and 50 are also rotatably supported on the transmission output shaft 34. The transmission output shaft 34 has drivingly connected thereto a final drive gear 52 which meshes with an output gear 54 which is drivingly connected with a driven shaft 56. The driven shaft 56 is adapted to be connected with the vehicle drive wheels or with a differential, not shown, in a wellknown manner.

The gear set 40-46 is the same size as gear set 20-28 and will therefore provide the first gear ratio. Gear set 42-48 is the same size as gear set 22-30 and will therefore provide the second gear ratio while gear set 44-50 will provide the third gear ratio. The gears 30 and 32 are selectively connectable to the output shaft 34 through a clutch mechanism 58 which can be considered a second or fourth ratio clutch. The gears 28 and 48 are selectively connectable with the output shaft 34 through a selectively engageable clutch mechanism 60 which can be considered a first or second ratio clutch. The gears 46 and 50 are selectively connectable with the transmission output shaft 34 through a selectively engageable clutch 62 which can be considered a first or third ratio clutch.

In the general operating sequence, clutch 62 will engage gear 46 to establish the first gear ratio. Vehicle movement will be occasioned by the engagement of input clutch 14 which will drivingly connect drive shaft 10 with transmission input shaft 18. Since input clutch 12 is disengaged, input shaft 16 is unloaded. At this time, the clutch 58 can be utilized to selectively engage gear 30 to output shaft 34, thus establishing the second gear ratio.

To connect the second gear ratio to the drive shaft 10, input clutch 14 is disengaged while input clutch 12 is engaged. To establish the third gear ratio, clutch 62 is disengaged from gear 46 and engaged with gear 50, thus establishing the third ratio through gears 44 and 50.

To connect the third gear ratio to the drive shaft 10, clutch 12 is disengaged while clutch 14 is engaged. After disengagement of clutch 12, clutch 58 can be disengaged from gear 30 and engaged with gear 32, thus establishing the fourth ratio. To engage the fourth ratio with the drive shaft 10, clutch 14 is disengaged while clutch 12 is engaged.

During all of these drive ratios, the reverse idler gear 38 would be maintained in the phantom position 64 out of engagement with the gears 26 and 36.

If it is desirable, due to operating conditions, to downshift the transmission from fourth ratio to second ratio, the clutch 60 is engaged with the gear 48, thus establishing the second gear ratio between input shaft 18 and output shaft 34. To complete the downshift, the clutch 12 is disengaged while the clutch 14 is engaged. After the disengagement of clutch 12, the clutch 58 can be disengaged from gear 32 and engaged with gear 30, thus establishing the second gear ratio between input shaft 16 and output shaft 34. After this clutch engagement, the input clutches 14 and 12 can be interchanged. Now the transmission is conditioned for a second to first downshift or a second to third upshift, depending on operating requirements.

If the vehicle is operating in third gear with clutch 62 engaging gear 50 and input clutch 14 engaged, a third to first downshift can be accomplished by engaging clutch 60 with gear 28 and then interchanging input clutches 12 and 14. After clutch 14 is disengaged, clutch 62 can be disengaged from gear 50 and engaged with gear 46 to establish the first gear ratio. After this clutch change, the input clutches 12 and 14 can be swapped or interchanged so that the transmission is prepared for a first to second upshift.

The input clutches 12 and 14 are preferably fluid operated friction clutches, however, mechanical, pneumatic or electrical type clutch operation can be utilized. Mechanisms for controlling such clutches are well-known and easily adaptable to the present transmission.

The clutches 58, 60 and 62 are preferably mechanical synchronizer type clutches which can be operated either manually, electrically, hydraulically or pneumatically in a well-known manner. If desired, it is possible to use friction type clutches in these locations also.

The transmission shown in FIG. 2 is similar to that shown in FIG. 1 but encompasses less overall length but would have a larger housing diameter. The transmission in FIG. 2 also has a drive shaft 10 to which is drivingly connected a pair of input clutches 12 and 14. The input clutch 12 is drivingly connected to an input shaft 70 and the input clutch 14 is drivingly connected to an input shaft 72. The input shaft 70 has drivingly connected thereto ratio drive gears 74, 76 and 78 which mesh with ratio driven gears 80, 82 and 84, respectively. These gear meshes are operable to establish first, second and fourth ratios, respectively. The driven ratio gear 80 is rotatably supported on a transmission output shaft 86, while the ratio driven gears 82 and 84 are rotatably supported on a transmission output shaft 88.

The transmission input shaft 72 has drivingly connected thereto a plurality of ratio drive gears 90, 92 and 94 which are in mesh with ratio driven gears 96, 98 and 100, respectively. These gear ratio meshes are operable to provide first, second and third ratios, respectively. The ratio driven gear 98 is rotatably supported on the output shaft 86. A ratio clutch 102 is disposed on the shaft 86 and is operable to selectively connect gear 80 or gear 98 therewith. The ratio driven gears 96 and 100 are rotatably supported on the output shaft 88 and can be selectively connected thereto by a ratio clutch 104. A ratio clutch 106 is provided to selectively connect gears 82 and 84 with the output shaft 88.

Output shaft 86 has connected thereto a drive gear 108 which meshes with an output driven gear 110 connected to a vehicle drive shaft 112. The output shaft 88 has drivingly connected thereto a drive gear 114 which meshes with the driven gear 110. Thus, both output shafts 86 and 88 are drivingly connected to the vehicle drive shaft 112.

The transmission input shaft 70 through judicious selection of clutches 102 and 106 can provide first, second and fourth ratio between the drive shaft 10 and vehicle drive shaft 112 when clutch 12 is engaged. While judicious selection of clutches 102 and 104 can provide first, second and third gear ratios between drive shaft 10 and vehicle drive shaft 112 when input clutch 14 is engaged.

By selective interchange of the clutches 104 and 106 and input clutches 12 and 14, the transmission can be conditioned to operate between first and fourth gear ratios in a manner similar to that described above for FIG. 1. Through the use of clutch 102 and the interchange of input clutches 12 and 14, a fourth to second or third to first downshift can be controlled in a manner similar to that described above.

The use of two transmission output shafts 86 and 88 reduces the axial length of the transmission. However, with this arrangement, the transmission housing would be larger in cross sectional area.

From the above operating analysis of the transmissions shown in FIGS. 1 and 2, it should be apparent that a first to third or second to fourth upshift can also be provided. However, these maneuvers are generally not utilized in transmission operation. There are, however, a considerable number of operating conditions during which a fourth to second or third to first downshift is desirable. With conventional dual clutch type transmissions, such downshift patterns are not achievable. Therefore, it should be appreciated that the present invention provides an increased operating scope for the transmission. It will also be apparent to those skilled in the art that a reverse ratio, similar to that of FIG. 1, can be included in the transmission represented in FIG. 2.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A dual input clutch type transmission comprising: a drive shaft; a pair of input shafts; a pair of input clutches selectively operable to connect said drive shaft with respective ones of said input shafts; first, second and third ratio gears drivingly connected to one of said input shafts; first, second and fourth ratio gears drivingly connected to the other of said input shafts; output shaft means; a plurality of driven gear means rotatably supported on said output shaft means and meshing with said first, second and third ratio gears on said one input shaft and with said first, second and fourth ratio gears on said other input shaft; and a plurality of mechanical clutch means for selectively drivingly connecting said driven gear means with said output shaft means and for cooperating with said input clutches to selectively provide first, second, third and fourth ratios between said drive shaft and said output shaft means, whereby a shift from fourth ratio to second ratio can be accomplished by engaging the appropriate mechanical clutch means to establish second ratio between the one input shaft and the output shaft means while fourth ratio is established through the other input shaft and then interchanging said input clutches so that fourth ratio is disengaged from the drive shaft while second ratio is engaged with the drive shaft.

2. A dual input clutch type transmission comprising: a drive shaft; a pair of transmission input shafts; a pair of input clutches selectively operable to connect the drive shaft with respective ones of said transmission input shafts; first, second and third ratio gears drivingly connected to one of said transmission input shafts; first, second and fourth ratio gears drivingly connected to the other of said transmission input shafts; a transmission output shaft; a plurality of driven gears rotatably supported on said output shaft and meshing with said first, second and third ratio gears on said one transmission input shaft and with said first, second and fourth ratio gears on said transmission input other shaft; and a plurality of ratio clutch means for selectively drivingly connecting said driven gears with said output shafts whereby a shift from fourth ratio to second ratio can be accomplished by engaging the appropriate ratio clutch means to establish second ratio between the one transmission input shaft and the output shaft while fourth ratio is established between the other transmission input shaft and said output shaft and then interchanging said input clutches so that fourth ratio is disengaged from the drive shaft while second ratio is engaged with the drive shaft.

3. A dual input clutch type transmission comprising: a drive shaft; a pair of transmission input shafts; a pair of input clutches selectively operable to connect the drive shaft with respective ones of said transmission input shafts; first, second and third ratio gears drivingly connected to one of said transmission input shafts; first, second and fourth ratio gears drivingly connected to the other of said transmission input shafts; an output shaft; a plurality of driven gears rotatably supported on said output shaft and meshing with said first, second and third ratio gears on said one shaft and with said first, second and fourth ratio gears on said other shaft; and a plurality of ratio clutch means for selectively drivingly connecting said driven gears with said output shafts whereby a shift from third ratio to first ratio can be accomplished by engaging the appropriate ratio clutch means to establish first ratio between the other transmission input shaft and the output shaft while third ratio is established between said one transmission input shaft and said output shaft and then interchanging said input clutches so that third ratio is disengaged from the drive shaft while first ratio is engaged with the drive shaft and after completion of said interchange the appropriate ratio clutch can be engaged to establish the first ratio between said one transmission input shaft and said output shaft and said input clutches can be interchanged.

4. The dual input clutch type transmission of claim 1 further comprising: said mechanical clutch means being operable to provide a shift from third ratio to first ratio by engaging the appropriate mechanical clutch means to establish first ratio between the other transmission input shaft and the output shaft means while third ratio is established between said one transmission input shaft and said output shaft and then interchanging said input clutches so that third ratio is disengaged from the drive shaft while first ratio is engaged with the drive shaft and after completion of said interchange the appropriate mechanical clutch can be engaged to establish the first ratio between said one transmission input shaft and said output shaft means and said input clutches can be interchanged.

5. The dual input clutch type transmission of claim 3 further comprising: said plurality of ratio clutch means being selectively drivingly connecting said driven gears with said output shafts to provide for a shift from fourth ratio to second ratio by engaging the appropriate ratio clutch means to establish second ratio between the one transmission input shaft and the output shaft while fourth ratio is established between the other transmission input shaft and said output shaft and then interchanging said input clutches so that fourth ratio is disengaged from the drive shaft while second ratio is engaged with the drive shaft.

* * * * *